(12) United States Patent
Sheeks

(10) Patent No.: US 6,250,655 B1
(45) Date of Patent: Jun. 26, 2001

(54) LEVERAGING TRANSPORT SYSTEM FOR TABLES PLASTERBOARD SHEETS AND THE LIKE

(76) Inventor: Oliver Perry Sheeks, 2601 El Sereno Dr., Orange, CA (US) 92867

( * ) Notice: Subject to any disclaimer, the term of this patent is extended or adjusted under 35 U.S.C. 154(b) by 0 days.

(21) Appl. No.: 09/307,271

(22) Filed: May 7, 1999

(51) Int. Cl.$^7$ ....................................................... B62B 1/06
(52) U.S. Cl. .................... 280/79.7; 280/79.4; 280/47.18; 280/652; 414/11; 414/590; 414/546
(58) Field of Search .................................. 280/79.4, 79.6, 280/79.7, 79.11, 47.18, 652, 655; 294/16, 15, 119.1, 103.1; 414/11, 590, 546, 495

(56) References Cited

U.S. PATENT DOCUMENTS 897,853 * 9/1908 Scheidt ................................. 280/79.7

(List continued on next page.)

*Primary Examiner*—Michael Mar
*Assistant Examiner*—Hau Phan
(74) *Attorney, Agent, or Firm*—William L. Chapin

(57) ABSTRACT

A system for manipulating and transporting relatively large, flat, heavy tabular articles such as portable folding conference tables and construction materials such as plywood or plasterboard sheets comprises a leveraging dolly for lifting an article from a horizontally oriented position at a first location to a vertically oriented position in which the article may be rolled on the dolly to a second location, and a racking cart for receiving and transporting a plurality of articles individually loadable from and onto the leveraging dolly which includes a base rollaby supported by a pair of laterally spaced apart casters, one having a horizontally disposed axle fixed with respect to the base, and the other having a horizontally disposed axle rotatable in a horizontal plane on a vertically disposed swivel attached to the base. The base has protruding from the upper flat surface thereof a longitudinally elongated lower article support channel having a U-shaped cross section, the channel having an upwardly depending opening for receiving an end wall of a flat table or other tabular article, the channel being located laterally between the two casters and parallel to the rolling direction of the fixed caster.

An elongated handle protruding perpendicularly upward from the upper surface of the base vertically slidably supports an upper article retainer structure having protruding downwardly from the lower surface thereof an upper U-shaped cross-section article support channel vertically alignable with the lower article support channel. A tensioning element such as a tension spring urges the two channels together, so that the rear edge wall of a table or other flat article may be received in the lower article support channel, the tension element stretched, and the front edge wall of the article engaged by the upper article support channel. With a horizontally disposed table thus engaged by the dolly disposed horizontally above the table, the outer end of the dolly handle may be grasped to leverage the table upwardly and rearwardly, the rear table leg feet serving as fulcrums. With the dolly handle pivoted in a vertical plane to an upright vertical position, the dolly and table may be rolled on the casters to a desired location.

A racking cart according to the present invention includes a generally flat, H-shaped base rollably supported by casters. A central article support bale having the shape of an inverted U protrudes perpendicularly upwardly from the base, the bale lying in a medial vertical plane through the horizontal cross arm of the H. A pair of rectangularly-shaped openings protrude inwardly from the respective front and rear edge walls of the base are of sufficient size to receive the dolly rolled inwardly to position a table or other article carried by the dolly to be propped up against the center bale, whereupon the upper and lower article support channels on the dolly may be disengaged from the sides of the table, and the dolly rolled out from the opening. In this manner, pairs of articles may be loaded onto opposite sides of the central bale of the racking cart, until a desired number of articles up to the capacity limit of the cart have been loaded. Pairs of bumper stops protruding upwardly from the upper surface of the cart base, near the front and rear edges of the cart, prevent the lower ends of articles stacked on the cart from sliding off the cart. Optionally, removable vertically disposed end-bales may be attached to the front and rear edges of the cart after it is loaded, to further secure articles on the cart.

26 Claims, 5 Drawing Sheets

U.S. PATENT DOCUMENTS

| | | | | |
|---|---|---|---|---|
| 1,221,997 | * | 4/1917 | Koehler | 280/79.11 |
| 4,043,536 | * | 8/1977 | Almond | 294/15 |
| 4,135,655 | * | 1/1979 | Brown | 294/103.1 |
| 4,630,838 | * | 12/1986 | Stockton | 280/79.11 |
| 5,069,495 | * | 12/1991 | Mears | 294/15 |
| 5,120,072 | * | 6/1992 | Laramie | 280/79.7 |
| 5,257,843 | * | 11/1993 | Nunn | 294/15 |
| 5,318,316 | * | 6/1994 | Shurtleff | 280/79.7 |
| 5,449,266 | * | 9/1995 | Evans | 414/495 |
| 5,765,843 | * | 6/1998 | Miller | 280/79.9 |
| 5,988,659 | * | 11/1999 | Young | 280/79.7 |
| 6,036,219 | * | 3/2000 | Oefelein et al. | 280/47.35 |
| 6,082,956 | * | 7/2000 | Pentland | 414/495 |

* cited by examiner

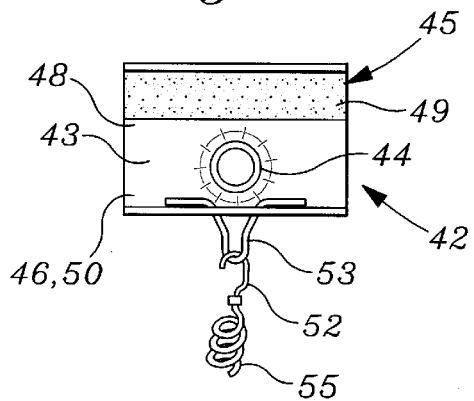
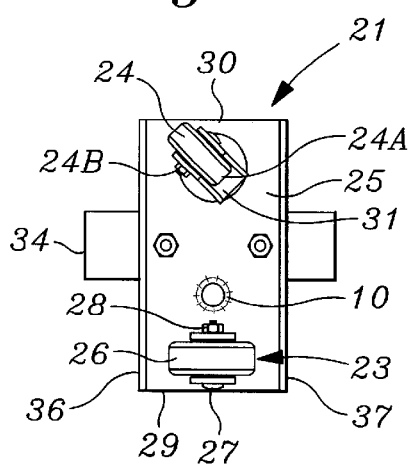
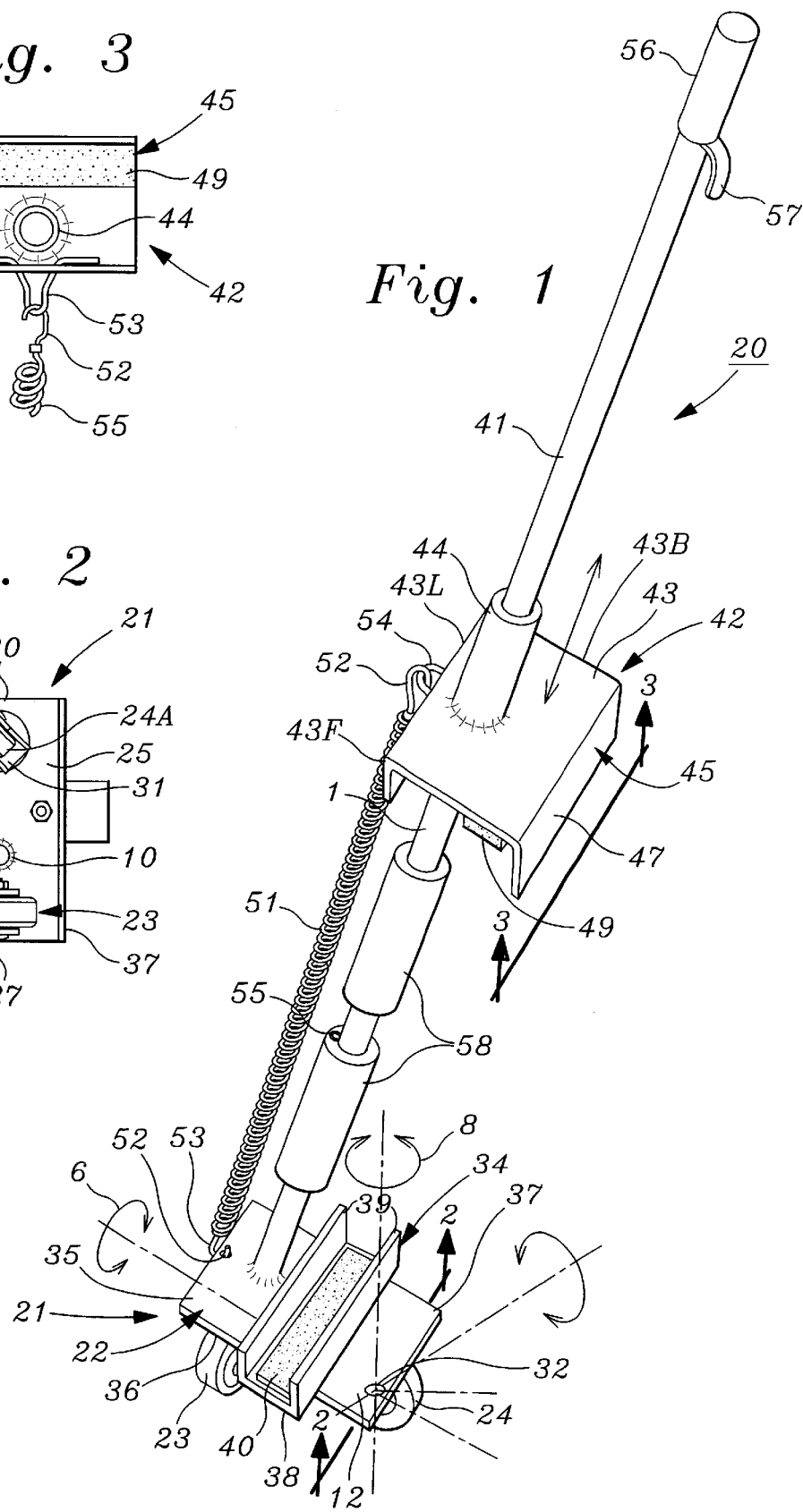

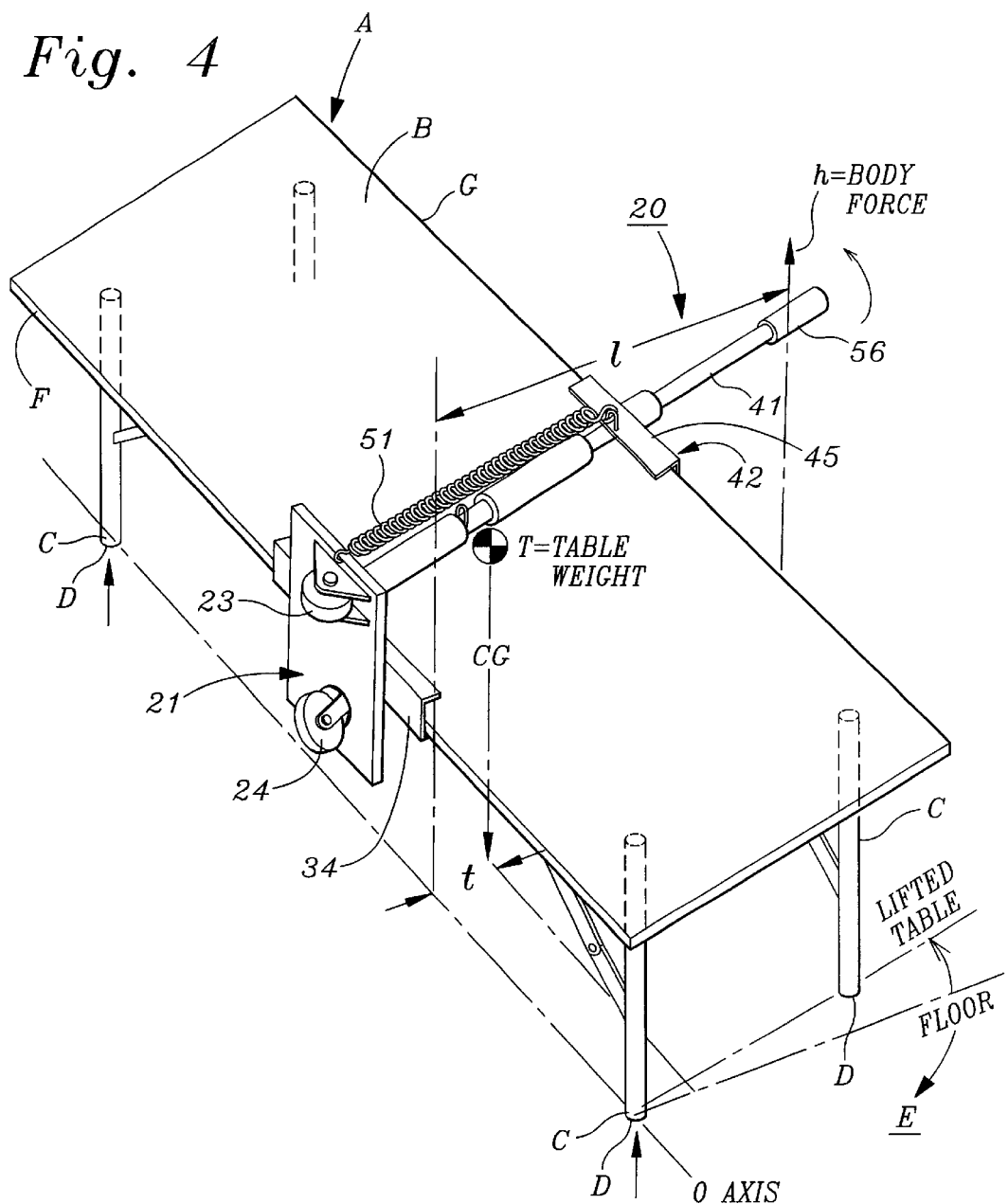

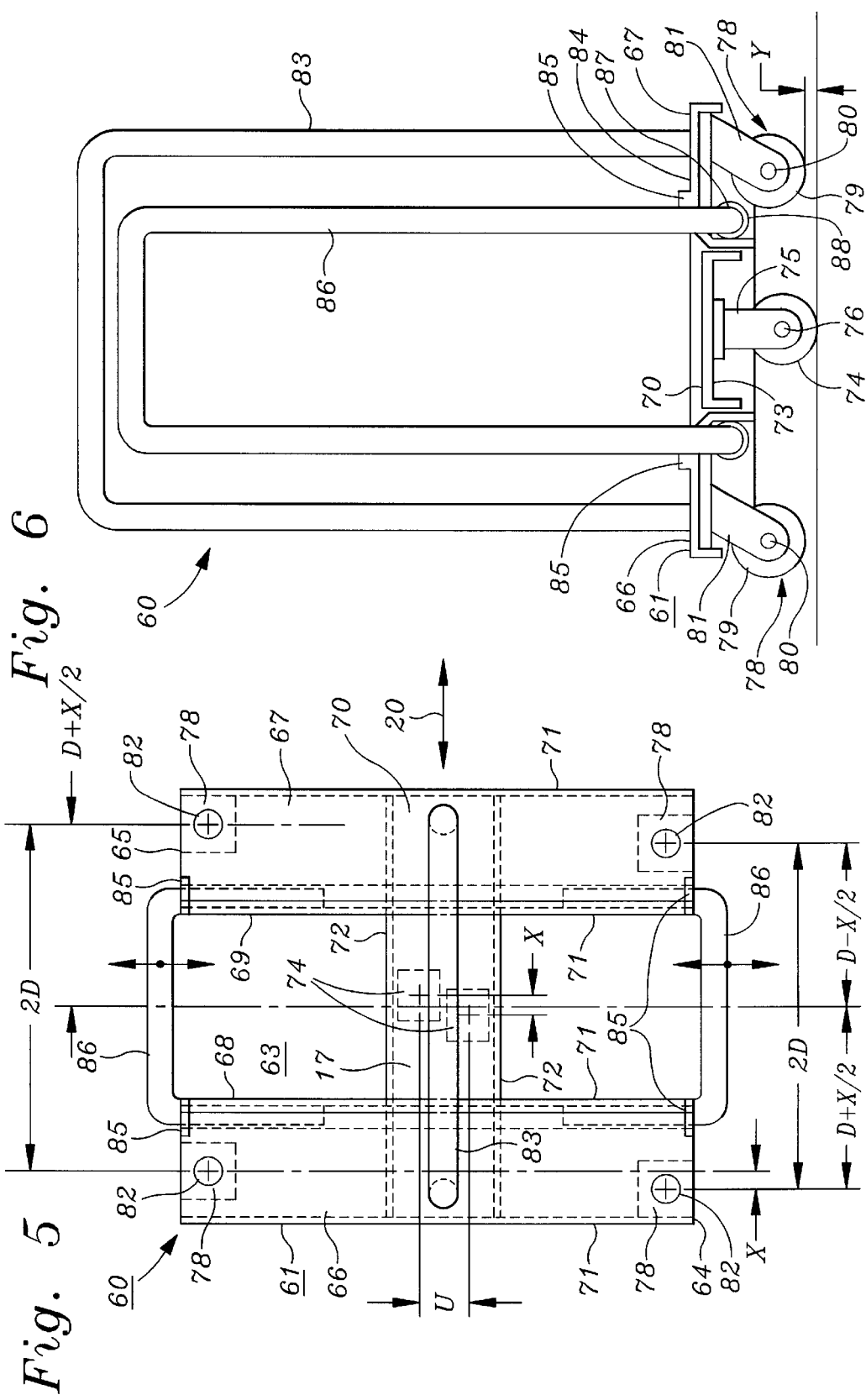

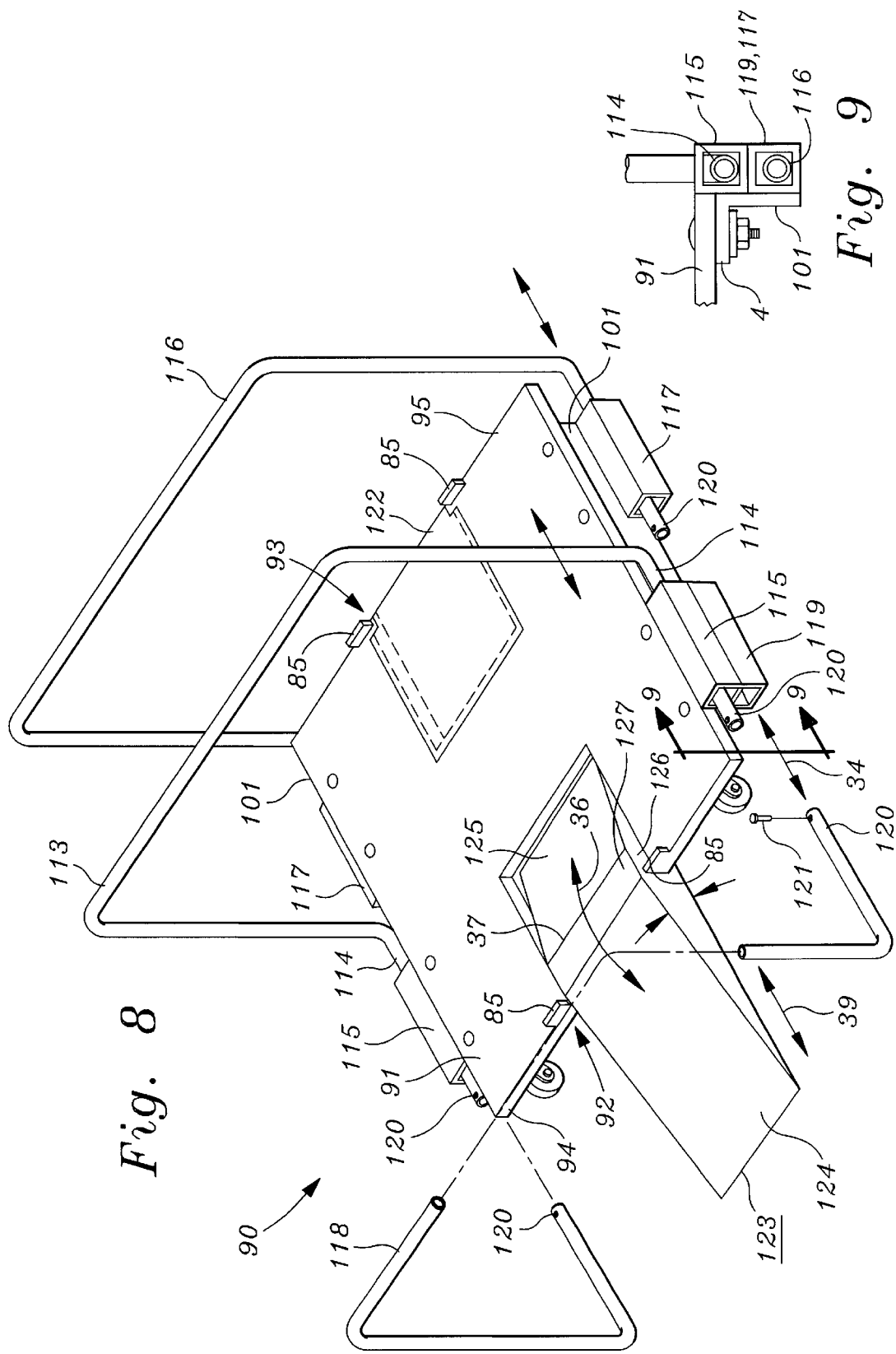

LEVERAGING TRANSPORT SYSTEM FOR TABLES PLASTERBOARD SHEETS AND THE LIKE

BACKGROUND OF THE INVENTION

A. Field of the Invention

The present invention relates to implements and apparatus for manually transporting and manipulating relatively large, heavy, and generally flat articles such as tables and construction materials in the form of large flat sheets of plywood, plasterboard, or the like. More particularly, the invention relates to a transport system for articles of the character described, comprising a leveraging dolly for lifting and transporting individual tables or other such articles, and a racking cart which functions in combination with the leveraging dolly to receive and transport a quantity of tables or tabular construction materials.

B. Description of Background Art

Tables provided with folding legs are widely used during conferences, seminars and similar events held at schools, banquet halls, hotels, churches and a wide variety of other such venues. Since the location, layout and number of such tables required for a particular event are all variable, it is customary to transport such tables with the legs folded-up from a storage area to a hall or other event site, unfold the legs and place the tables at desired locations of the site. Upon completion of an event, the tables must be folded up, lifted onto a cart, and transported to a storage area or other location.

The tasks of transporting, unfolding, deploying, and re-folding or "knocking down" tables described above are generally performed by humans without the assistance of machines, and thus require a substantial expenditure of physical labor. Typical tables of the type used at conferences, churches and other such venues are six to eight feet long, 24 to 36 inches wide, and may weight 40 to 90 pounds or more. Round tables for similar applications may be five feet or more in diameter and are similarly heavy. Thus, it can be readily appreciated that such tables are ergonomically awkward for a person to handle, and that lifting, folding and unfolding such tables can and does frequently result in muscle or back strain, or more serious injuries. In many churches, in particular, older volunteer persons are frequently called upon to undertake the task of transporting, setting up and taking down folding tables, with even greater risk of straining muscles in the back or other parts of the body. In fact, the amount of force which must be exerted by an individual to tilt a folding table into an upright position preparatory to folding the table legs parallel to the table top for convenient transporting of the table frequently requires the exertion of physical strength beyond that which an elderly person may be reasonably expected to be capable of.

In addition to the ergonomic problems in manipulating tables alluded to above, present methods of manipulating and transporting tables often result in damage to the table; caused for example, by impact of a table corner with a floor or wall, or misuse of a table appendage as an unintended handle.

The handling of certain building materials widely used in the construction industry is beset with problems similar to those associated with the deployment of folding tables, as described above. Thus, many residential, commercial and industrial building construction projects utilize a variety of large, flat heavy structural or ornamental materials such as plywood panels, plasterboard sheets referred to as "dry wall" or "sheetrock," and the like. Such tabular construction materials are typically delivered to a construction site and deposited there in a flat stack. From there, individual sheets are carried to an installation location such as on a wall or floor, and secured in place. Typical construction sheet material is manufactured and supplied as 4 ft. by 8 ft. sheets weighing up to 100 pounds or more. Therefore, moving such sheets requires a great deal of expended energy, and at present is usually assisted only by such contrivances as a simple wheeled cart.

In view of the foregoing problems associated with the transportation and disposition or relatively heavy and cumbersome articles such as folding conference tables and tabular construction materials such as plywood sheets, plasterboard sheets, and the like, the present invention was conceived of.

OBJECTS OF THE INVENTION

An object of the present invention is to provide a leveraging dolly for engaging a heavy article such as a table or tabular sheet of construction material, tilting the article from a horizontally disposed use or stacked orientation to a vertical transport orientation, and transporting to article to another location by a human operator with minimal exertion of physical force.

Another object of the invention is to provide a leveraging dolly for lifting rectangular and round tables of various sizes from a horizontally deployed use position to a vertical transporting position, and for manually transporting the upright table to a desired location.

Another object of the invention is to provide a racking cart for transporting varying numbers of upright rectangular or round tables or tabular sheets of construction material, the cart being so designed as to accommodate relatively heavy loads, and being of relatively light weight, while being stable against inadvertent tipping.

Another object of the invention is to provide a transport system for tables, plasterboard sheets and similar tabular articles which comprises in combination a leveraging dolly for tilting a table or other such flat article from a horizontal position to an upright position and transporting the article, and a racking cart for engageably receiving the dolly, offloading the article from the dolly, and holding and transporting a plurality of articles thus received.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprises a transport system for manipulating and transporting by human power relatively large, heavy and flat objects such as rectangular and round tables with folding legs, and tabular building materials such as plywood or plasterboard sheets. A transport system according to the present invention includes a leveraging dolly for receiving, manipulating and transporting a single table, one or more sheets of construction material or similar article, and a racking cart engageable with the dolly for receiving and transporting a plurality of tables or other such tabular articles individually transported to the cart, and for unloading individual articles onto the dolly for transport to various locations.

A leveraging dolly according to the present invention includes a base rollably supported by a pair of laterally spaced apart casters, one having a horizontally disposed axle fixed with respect to the base, and the other having a horizontally disposed axle rotatable in a horizontal plane on a vertically disposed swivel attached to the base. The base has protruding from the upper flat surface thereof a longitudinally elongated lower article support channel having a U-shaped cross section, the channel having an upwardly depending opening for receiving an end wall of a flat table or other tabular article, the channel being located laterally between the two casters and parallel to the rolling direction of the fixed caster.

An elongated handle protruding perpendicularly upward from the upper surface of the base vertically slidably supports an upper article retainer structure having protruding downwardly from the lower surface thereof an upper U-shaped cross-section article support channel vertically alignable with the lower article support channel. A tensioning element such as a tension spring urges the two channels together, so that the rear edge wall of a table or other flat article may be received in the lower article support channel, the tension element stretched, and the front edge wall of the article engaged by the upper article support channel. With a horizontally disposed table thus engaged by the dolly disposed horizontally above the table, the outer end of the dolly handle may be grasped to leverage the table upwardly and rearwardly, the rear table leg feet serving as fulcrums. With the dolly handle pivoted in a vertical plane to an upright vertical position, the dolly and table may be rolled on the casters to a desired location.

A racking cart according to the present invention includes a generally flat, H-shaped base rollably supported by casters. A central article support bale having the shape of an inverted U protrudes perpendicularly upwards from the base, the bale lying in a medial vertical plane through the horizontal cross arm of the H. A pair of rectangularly-shaped openings protrude inwardly from the respective front and rear edge walls of the base. The openings are of sufficient size to receive a leveraging dolly which may be rolled inward to position a table or other article carried by the dolly to be propped up against the center bale, whereupon the upper and lower article support channels on the dolly may be disengaged from the edges of the table, and the dolly rolled out from the opening. In this manner, pairs of articles may be loaded onto opposite sides of the central bale of the racking cart, until a desired number of articles up to the capacity limit of the cart have been loaded. Pairs of bumper stops protruding upwardly from the upper surface of the cart base, near the front and rear edges of the cart, prevent the lower ends of articles stacked on the cart from sliding off the cart. Optionally, removable vertically disposed end-bales may be attached to the front and rear edges of the cart after it is loaded, to further secure articles on the cart.

BRIEF DESCRIPTION OF THE DRAWINGS

FIG. 1 is a perspective view of a leveraging dolly according to the present invention.

FIG. 2 is a lower plan view of the dolly of FIG. 1.

FIG. 3 is a transverse sectional view of the dolly of FIG. 1, taken along line 3—3.

FIG. 4 is a perspective view showing the manner of attaching the dolly of FIG. 1 to a table, preparatory to tilting the table from a horizontal, use orientation to a vertical, transport/storage orientation.

FIG. 5 is an upper plan view of a racking cart according to the present invention.

FIG. 6 is a front elevation view of the racking cart of FIG. 5.

FIG. 8 is a perspective view of an alternate embodiment of a racking cart according to the present invention.

FIG. 9 is a fragmentary front elevation view of the cart of FIG. 8.

DESCRIPTION OF THE PREFERRED EMBODIMENTS

Figure 7:
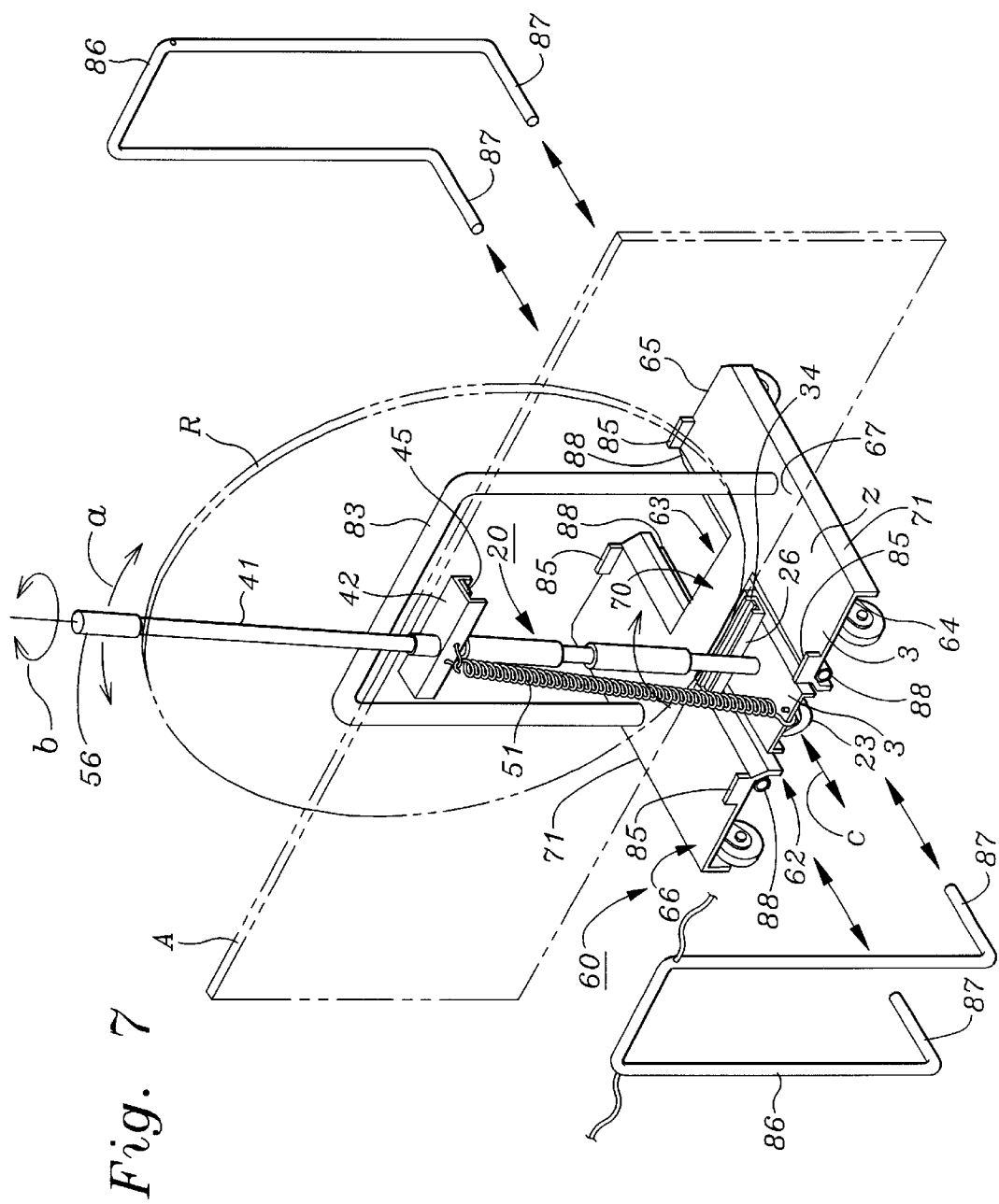
FIG. 7 is a perspective view of the racking cart of FIGS. 5 and 6, showing the cart engaged with the leveraging dolly of FIG. 1 to transfer articles between the dolly and cart.

FIGS. 1–3 illustrate a leveraging dolly according to the present invention, while FIG. 4 illustrates the manner of using the dolly to manipulate a table. FIGS. 5 and 6 illustrate a racking cart according to the present invention. FIG. 7 illustrates a transport system comprised of the leveraging dolly and racking cart of FIGS. 1–6. FIGS. 8 and 9 illustrate an alternate embodiment of a racking cart according to the present invention.

Referring first to FIG. 1, a leveraging dolly 20 according to the present invention may be seen to include a base 21 having the shape of a laterally elongated rectangular plate 22. Base plate 22 is preferably made of ⅛-inch thick sheet aluminum. As may be seen best by referring to FIG. 2 in addition to FIG. 1, base plate 22 of leveraging dolly 22 is rollably supported by a pair of laterally spaced apart casters including a fixed axle caster 23 and a swivelable caster 24, attached to lower surface 25 of the base plate. As shown in FIG. 2, fixed caster 23 includes a wheel 26 mounted on an axle 27 held parallel to base plate 22 within a frame 28. Frame 28 is rigidly attached to base plate 22 to orient axle 27 and the rotation axis of wheel 26 perpendicularly to the adjacent side wall 29 and opposite side wall 30 of the base plate.

Referring still to FIGS. 1 and 2, it may be seen that swivelable caster 24 includes a wheel 24A mounted on an axle 24B held parallel to base plate 22 within a frame 31. Frame 31 is attached to base plate 22 by a vertically disposed swivel pin 32 located near side wall 30 of the base plate. Thus arranged, wheel 24A of swivelable caster 24 is rotatable about axle 24B which is parallel to base plate 22, but swivelable about vertical swivel pin 32. As shown in FIG. 2, the rotation axis of fixed caster axle 27 and that of swivel axle 32 preferably both lie in a transversely disposed medial plane perpendicular to base plate 22.

Referring again to FIG. 1, it may be seen that leveraging dolly 20 includes a first, lower article support channel 34 which protrudes upwards from upper surface 35 of base plate 22. As shown in FIG. 1, lower article support channel 34 has a U-shaped cross section and is disposed perpendicularly to and protrudes outwards from the front and rear edge walls 36 and 37, respectively, of base plate 22. Lower article support channel 34 has a flat base 38 and perpendicularly upwardly depending opposite side walls 39, the latter being located laterally between casters 23 and 24.

Preferably, lower article support channel 34 is provided with an article cushioning pad 40 consisting of a longitudinally elongated rectangular pad made of ⅛-inch thick felt or other such resilient material, the pad being adhered to the upper surface of base 38 of the channel and spanning the length thereof.

As shown in FIG. 1, leveraging dolly 21 includes an elongated straight handle 41 which protrudes perpendicularly upwards from base plate 22 of the dolly. As shown in FIGS. 1 and 2, handle 41 is attached to base plate 22 at a location longitudinally midway between front and rear edge walls 36 and 37 of the base plate, and laterally between fixed caster 23 and left side wall 39 of lower article support channel 34. Handle 41 is fastened to base plate 22 by an convenient means, such as a welded joint. In a preferred embodiment, handle 41 was made of aluminum tubing having an outer diameter of 1 inch and an inner diameter of ¾-inch.

Referring now to FIGS. 1 and 3, leveraging dolly 20 may be seen to include an upper article retainer structure 42. As shown in FIGS. 1 and 3, upper article retainer 42 includes a longitudinally elongated rectangular plate 43 which may be made of ⅛-inch thick sheet aluminum. Plate 43 is penetrated by a tube 44 disposed perpendicularly to the plate, the longitudinal axis of the tube being located midway between the front and rear edges 43F and 43B of the plate, and offset laterally towards the left edge 43L of the plate. Tube 44 has a larger inner diameter than the outer diameter of handle 41, and is slidable thereon. In an example embodiment of leveraging dolly 20, tube 44 was made of aluminum tubing having an outer diameter of 1¼ inch and an inner diameter of 1⅛ inch. Tube 44 is fastened to cap plate 42 by an convenient means, such as a welded joint.

As may be sen best by referring to FIG. 3, leveraging dolly 20 includes a second, upper longitudinally elongated article support channel 45 which protrudes downwardly from lower surface 46 of article retainer 42. Upper article support channel 45 is preferably formed by a downwardly depending right side flange wall 47 of cap plate 43, and may include a laterally inwardly located inner side wall 48. Preferably, upper article support channel 45 is provided with an article cushioning pad 49 made of ¼-inch thick felt or other such resilient material, the pad being adhered to the lower surface 50 of the upper channel and spanning the length thereof. As shown in FIG. 1, upper article support channel 45 is vertically aligned with lower article support channel 34.

Leveraging dolly 20 includes means for resiliently urging upper article support channel 45 towards lower article support channel 34, so as to maintain opposite edges of an article, such as the front and rear edges of a table, engaged within the respective channels. Thus, as shown in FIG. 2, leveraging dolly 20 includes a tensioning element such as a tension spring or bungee cord 51. The latter is provided at opposite ends thereof with hooks 52 which engage a pair of eyes 53 and 54 that protrude upwardly from the upper surface of base plate 22 and laterally outwardly from the left edge wall of upper article retainer structure 42, respectively. Preferably, leveraging dolly 20 includes at least one additional, intermediate eye 55 attached to handle 41 at a location between base plate 22 and upper end 56 of handle 41. Thus arranged, a lower hook 52 of tensioning element 51 may be unhooked from lower eye 53 and hooked onto intermediate eye 55 to permit retainer structure 42 and upper channel 45 to move upward to accommodate a larger article between the upper article support channel and lower article support channel 34. For even larger articles, handle 41 of dolly 20 may optionally be provide near upper end 56 thereof with a downwardly protruding hook 57 to receive the upper end wall of an article. In this case, upper article retainer 42 would be rotated 180 degrees in a horizontal plane, to allow clearance for an article engaged by lower article support channel 34 and hook 57. Hook 57 may optionally be adjustably fastened to handle 41 at different heights to accommodate articles of different heights.

In a preferred embodiment of leveraging dolly 20, a lower portion of handle 41 is fitted with one or more coaxial article cushioning tubes 58 made of a resilient material such as rubber or polyurethane.

FIG. 4 illustrates a preferred method of using leveraging dolly 20 to manipulate a large flat tabular article such as a table A having a top B and foldable legs C with feet D resting on a floor surface E. As shown in FIG. 4, leveraging dolly 20 is positioned above table top B, upper article retainer 42 grasped and pulled upward on handle 41 against the spring tension of bungee cord 51, and the rear edge F of the table top engaged within lower article support channel 34. Then, upper article retainer 42 is released to allow upper article support channel 45 to engage front edge wall G of table top B. The upper end 56 of handle 46 may then be grasped and lifted upwardly, causing feet D of rear table legs C to function as fulcrums on which table A may be tilted to pivot table top B from a horizontal orientation to a vertical orientation in which the table is supported by lower article support channel 34. The maximum lifting force h required to be exerted by a person on handle 56 of leveraging dolly 20 to reorient table top B from a horizontally deployed orientation to a vertical orientation on the dolly is given by the equation: h=Tt÷l, where h is the required lifting force, T is the table weight, t is the perpendicular distance rearward from the center of gravity of the table to the rear table leg feet, and l is the distance between the rear table leg feet and the point of application of force on handle 56 of the leveraging dolly. In a typical example, t=12 inches and l=60 inches, so the amount of force h required to tilt the table is: (t÷l)T, or ⅕ T, i.e., only 20% of the table weight.

With table A vertically oriented on leveraging dolly 20 as described above, legs C of table A may be folded inward parallel to the lower side of table top B, whereupon the table may be grasped to roll dolly 20 in a direction parallel to the table top, i.e., parallel to wheel 26 of fixed caster 23, or rotated about the table's center of gravity around a corner. When it is desired to translate dolly 20 and table A sideways in tight spaces, away from a wall, for example, handle 41 of the dolly may be tilted in a vertical plane towards swivelable caster 24 to lift fixed caster 23 slightly off a floor or ground surface, allowing the dolly to be moved in any horizontal direction on the swivelable caster wheel.

FIGS. 5–7 illustrate a racking cart 60 comprising in combination with leveraging dolly 20 a leveraging transport system for tabular articles according to the present invention.

As shown in FIGS. 5–7, racking cart 60 includes a generally flat base 61 having in plan view a rectangular shape modified by a pair of front and rear opposed rectangularly-shaped cutouts 62 and 63 which protrude inwardly from the front and rear edge walls 64 and 65, respectively, of the base. Thus constructed, base 61 has in plan view the shape of an H, including left and right rectangular longitudinally disposed side bars 66 and 67 joined at the inner facing edge walls 68 and 69 thereof of a central laterally disposed rectangular-shaped cross arm 70.

In an example embodiment of racking cart 60, base 61 of the cart was made of ⅛-inch thick aluminum sheet stock.

Preferably, as shown in FIG. 7, the longitudinally disposed inner and outer edges of side bars 66 and 67 of base 61 are down turned to form flange walls 71. Similarly, the laterally disposed front and rear edges of base plate cross arm 70 are down turned to form flange walls 72. Thus constructed, side bars 66, 67 and cross arm 70 of base 61 have inverted U-shaped cross sections that form beams having greater rigidity than flat sheet members.

As may be seen best by referring to FIGS. 5 and 6, racking cart 60 is provided with six wheels fastened to the lower surface 73 of base 61 of the cart, for rollably supporting the cart. Thus, as shown in FIGS. 5 and 6, racking cart 60 has two fixed center caster wheels 74 fastened to cross arm 70 and having lateral roll directions. As shown in FIG. 5, the support frames 75 of center caster wheels 74 are offset longitudinally equal distances ½U from opposite fore and aft sides of a vertical transverse medial plane through cross arm 70, and offset laterally equal distances ½X from opposite lateral sides of a vertical longitudinal medial plane through the cross arm. Thus, the roll axes of axles 76 of cross arm wheels 70 are offset laterally by a distance X from one another. As will be explained in further detail below, the lateral misalignment of axles 76 is provided to help prevent wheels 74 from becoming lodged in a floor discontinuity such as a grooved seam or grout line.

Referring still to FIGS. 5 and 6, it may be seen that racking cart 60 is also provided with four swivelable corner casters 78 attached to lower surface 73 of cart base 61, near the four corners thereof. Each of the four corner casters 78 comprises a wheel 79 rotatable on a horizontally disposed axle 80 mounted in a frame 81 which is swivelable 360 degrees about a vertically disposed swivel pin 82 held in a bearing plate. As shown in FIG. 5, swivelable corner casters 78 comprise front and rear laterally aligned pairs proximate front and rear edge walls 64 and 65, respectively, of base 61. However, as shown in FIG. 5, front and rear caster pairs 78 proximate each side wall of base 61 are laterally misaligned by a distance X, to prevent a front/rear pair of wheels from becoming lodged in a floor discontinuity such as a groove seam disposed perpendicularly to the lateral travel direction of the cart when it is rolled on a surface. Thus, the lateral misalignments of longitudinal pairs of axles 80 of corner casters 78, in conjunction with the misalignment of caster wheels 74, allows cart 60 to glide smoothly over rough floorings.

The spacing between caster wheels 78 of racking cart 60 is chosen to minimize dynamic shocks to the racking cart and a load thereon, to help insure smooth rolling over floor surfaces having periodic discontinuities, such as tile or concrete grout lines or seams. Thus spacings of the six casters, defined by the letters D, 2D and X in FIG. 5, are selected to minimize the possibility of two or more casters being in a crack, groove, or other such floor discontinuity at the same time. For example, typical tile sizes and spacings (and that of some bricks) according to both American and metric standards include 3½, 4, 5, 6, 7, 8, 9, 10, 11, 12, 13, 14 inch sizes with ¼ inch grout widths, while Italian tile sizes typically conform to a fractional meter standard of ¼, 310, and ⅓ meters, plus typical lot tolerances of approximately ⅙ inch for commercial tile. The periodic spacings equal the sum of the tile spaces and one grout width, and multiples thereof. Optimum mounting spacings (D) and (X) of the casters to insure that only one of the six wheels of cart 60 is in a grout groove at one time may be found by considering the following formula: D=repetitive design dimensional cycle (including a grout width)±radius of swivel's floor contact foot print±X/2 coaxial misalignments. The values of D are preferably chosen to suit typical tile sizes. Of course, different spacings could be chosen to further improve smoothness for specific local applications not meeting the above listed tile sizes. An example of spacings X and D which allow for 180-degree swivel design swings of ±1¼ inch radius and yet avoid dual contact with the listed discontinuities are D=10 3/16 inch and X/2=⅛ inch; yields $8^{15}/_{16\ \pm 1/8}$ inch and $11^{7}/_{16 \pm 1/8}$ inch which are not coincident with the periodic spacings listed above.

Referring still to FIGS. 5 and 6, it may be seen that racking cart 60 has an inverted U-shaped, central article support bale 83 which protrudes perpendicularly upwards from upper surface 84 of base 61. Article support bale 83 is preferably made of a light, rigid material such as aluminum tubing, or thin-walled steel tubing, and is located in a transverse vertical medial plane through cross arm 70 of base 61.

Referring now to FIG. 5, it may be seen that, with racking cart 60 unloaded, the lower surfaces of four corner casters 78 are preferably spaced a distance Y above a surface on which the cart is supported. With this construction, cross arm 70 of cart 60 is provided with sufficient flexure so that opposite lateral portions of the cross arm bend slightly downwards when the cart is loaded with articles, thus placing the lower surfaces of corner casters 78 in contact with the supporting surface, but with less pressure than fixed center caster wheels 74. The novel design permits cart 60 to be rolled laterally without a tendency to yaw, yet be turned readily with correspondingly light pivot torque resistance from the lighter loaded corner casters.

As shown in FIGS. 5 and 6, racking cart 60 is provided with front and rear laterally opposed pairs of bumper stops 85 protruding from upper surface 84 of base 61, near front and rear edge walls 64 and 65, respectively, of base 61.

Racking cart 60 may optionally be provided with front and rear end bales to further secure articles leaned up against front and rear sides of central vertical article support bale 83. Thus, as shown in FIGS. 5 and 6, racking cart 60 may be provided with front and rear, inverted U-shaped tubular end bales 86 having perpendicularly inwardly disposed ends 87 which are insertably received in front and rear pairs of longitudinally disposed tubes 88 fastened to the under side of base 61.

FIG. 7 illustrates the manner of using a leveraging transport system comprising leveraging dolly 20 and racking cart 60 described above.

As shown in FIG. 7, the upper end 56 of handle 41 of leveraging dolly 20 may be grasped and tilted towards swivelable caster 24 of the dolly (to the right in FIGS. 1 and 7) to permit the dolly to roll on the swivelable caster rather than on wheel 26 of fixed dolly caster 23. This action permits the dolly to be rolled perpendicularly to article lower support channel 34 and a rectangular table A or a sheet of tabular constructive material, or a round table R, held within the channel, thus allowing the dolly to roll into front opening 62 of racking cart 60, and thereby translate the article laterally into position against the front surface of central article support base 83. Upon article retainer 42 may then be grasped and pulled upwardly against the tension of bungee cord 51, disengaging upper article support channel 45 from the upper edge of article A. Upper end 56 of leveraging dolly handle 41 may then be grasped, twisted, and pivoted in a vertical plane as indicated by the arrows in FIG. 7, to disengage the lower edge of article A from lower article support channel 34 of the leveraging dolly, whereupon the leveraging dolly may be rolled outwardly from front opening 62 of racking cart 60. In an exactly analogous manner, leveraging dolly 20 may be used to fetch another article, and the article loaded onto the rear side of racking cart 60 through rear base opening 63 of the racking cart, and propped up against the rear surface of central article support bales 83. Thus, pairs of articles may be loaded on opposite sides of central article support 63, until a desired number of articles up to the load capacity of racking cart 60 have been loaded. onto the racking cart. Since the loading of racking cart 60 is balanced, there is no tendency for the cart to tip, even when made of light weight materials and carrying heavy loads.

When a desired number of articles have been loaded onto racking cart 60, front and rear U-shaped end bales 86 may be attached to the cart to further secure articles on the cart, whereupon the cart and articles may be rolled to a desired destination, in a direction parallel to cross arm 70 of the cart. At the destination location, individual articles may be unloaded and stored or deployed using leveraging dolly 20, by reversing the aforementioned steps described above for loading an article onto the dolly and subsequently onto the racking cart.

FIGS. 8 and 9 illustrate an alternate embodiment or modification of racking cart 60.

As shown in FIGS. 8 and 9, modified racking cart 90 is substantially similar in structure and function to racking cart 60 described above, with the following differences. Racking cart 90 has a central vertically disposed tubular article support bale 113, which has an inverted U-shape, modified by horizontally forwardly angled lower end portions 114 which are insertably received in a pair of laterally opposed, upper, square cross-section central bale support tubes 115 attached to opposite side flange walls 101 of racking cart base 91. As shown in FIG. 8, central bale support tubes 115 are located near front edge wall 94 of racking cart 90.

Referring still to FIG. 8, racking cart 90 may be seen to include a rear end bale 116 shaped substantially similarly to central article support bale 113, the rear bale having forwardly protruding horizontal end portions of which are received in a pair of laterally opposed, lower, square cross section rear bale support tubes 117 attached to opposite side flange walls 101 of racking cart base 91. Rear bale support tubes 117 are located near rear edge wall 95 of racking cart 90, at a height below that of central bale support tubes 115.

As shown in FIGS. 8 and 9, racking cart 90 also includes a front bale 118 shaped substantially similarly to rear end bale 116, the lower rearwardly protruding horizontal end portions of which are received in a pair of laterally opposed, square cross section front base support tubes 119 located underneath central bale support tubes 115.

As shown in FIG. 8, the outer ends of the lower portion of center and end bales 113, 116 and 118 may be provided with vertically disposed perforations 120 for receiving safety retainer pins 121 after being inserted into their respective support tubes.

Referring still to FIG. 8, it may be seen that cart 90 may optionally be provided with one or two cover plates 122 which fit into rear opening 93 and/or front opening 92 of the cart, to provide additional support for articles loaded onto the cart, or to adapt the cart for conveying articles other than tabular articles in a generally vertical orientation.

As is also shown in FIG. 8, a transport system including a racking cart 60 or 90 may optionally include a loading ramp 123 which facilitates a method of loading onto the cart articles, including non-tabular, irregularly-shaped articles, which may overhang the cart, from leveraging dolly 20, or from a standard two-wheeled truck dolly having a wheel and axle span less than the width of openings 62, 63 or 92, 93. Ramp 123 includes front and rear laterally opposed symmetric front and rear wedges 124 and 125 having right triangular longitudinal cross sectional shapes, and joined at rear and front vertical sides thereof by a central rectangularly shaped block section 126 having an upper horizontally disposed laterally elongated rectangular apex surface 127. Apex surface 127 has a height sufficient to insure that the lower edges of articles on a dolly clear stops 85 when the dolly is rolled up the ramp. Loading ramp 123 also has a width less than that of front or rear openings 62 or 63 of cart 60, or 92 and 93 of cart 90, allowing the ramp to be slid longitudinally inwards into the opening as shown in FIG. 8. With ramp 123 thus positioned, leveraging dolly 20, or a truck dolly, holding an article may be rolled up and over upper surface 127 of ramp 123, whereupon the dolly may be disengaged from the article to place it on the cart, as described above. Ramp 123 may be used in a similar fashion at a destination location to off-load individual articles from racking cart 60 or 90 onto leveraging dolly 20, or a truck dolly.

What is claimed is:

1. A leveraging implement for manipulating a tabular article such as a table or sheet of construction material between a generally horizontal use or storage orientation and a generally vertical transport orientation, said leveraging implement comprising;
   a. a base having upper and lower surfaces,
   b. a first, lower article support channel protruding upwardly from said base, said lower article support channel having a longitudinal axis parallel to the upper surface of said base, and an upwardly facing opening adapted to receive a first edge wall of an article,
   c. a longitudinally elongated handle protruding vertically upwardly from said base at a location spaced laterally apart from said lower article support channel, said handle having an upper, hand grip portion,
   d. second, upper article support member having a second, upper article support channel attached to said handle longitudinally spaced apart from said lower article support channel, said upper article support channel having a downwardly facing opening alignable with said lower article support channel opening and adapted to insertably receive a second edge wall of said article,
   e. means for maintaining said upper and lower article support channels at a vertically spaced apart distance in which said first and second edge walls of said article are retained in said lower and upper article support channels, respectively,
   f. a first, fixed-axle wheel protruding downwardly from said base, said first wheel having a horizontally disposed roll axis which lies in a plane containing a central longitudinal axis of said handle, and
   g. a second, swivelable axle wheel protruding downwardly from said base, said second wheel having a horizontally disposed roll axis and a swivel axis lying in said plane containing said central longitudinal axis of said handle, on a side of said handle opposite that of said first wheel, whereby said upper hand grip portion of said handle may be grasped and tilted in said place to thereby pivot in said plane said base and second edge of said tabular article relative to said first edge, around said roll axis of said swivelable axle wheel.

2. A leveraging dolly for manipulating a tabular article such as a sheet of construction material or a table having front and rear edges, between a generally horizontal storage or use orientation to a generally vertical transport or storage orientation, respectively, and for rollably transporting said article, said leveraging dolly comprising;
  a. a base having a generally flat upper surface,
  b. a first, lower article support channel protruding upwardly from said upper surface of said base, said lower article support channel having a longitudinal axis parallel to said upper surface of said base, and an upwardly facing opening adapted to receive a first, rear edge of a tabular article,
  c. first, fixed-axle rolling means protruding downwardly from a lower surface of said base, said first rolling means being located proximate a first lateral side of said base and having a roll direction parallel thereto, and to said longitudinal axis of said lower article support channel,
  d. second, swivelable-axle rolling means having a swivel axle and protruding downwardly from said lower surface of said base, said second rolling means being located at a position on a side of said lower article support channel, opposite that of said first rolling means,
  e. an elongated handle protruding upwardly from said base on the same side of said lower article support channel as said first rolling means, said handle having an upper, hand grip region, a longitudinal axis of said handle and said swivel axle lying in a plane perpendicular to said roll direction of said fixed axle wheel,
  f. a second, upper article support member longitudinally slidably attached to said handle, said upper article support member having a second, downwardly protruding, upper article support channel having a downwardly facing opening adapted to receive a second, front edge of a tabular article, and
  g. means for resiliently urging said upper and lower article support channels longitudinally towards one another, thereby maintaining said edge walls of said article within said channels while said upper end of said handle is pivoted upwardly in a vertical plane to elevate said front edge of said article in a vertical plane to a generally vertical position in which said dolly and said article may be rolled on said rolling means between desired locations, and said handle pivoted downwardly in a vertical plane to pivot said dolly and said held article downwardly on said second swivelable axle rolling means to elevate said first rolling means upwardly with respect to a floor surface, thereby enabling said dolly and article to be swivelled about a swivel axis of said second rolling means.

3. The leveraging dolly of claim 2 wherein said upper article support member is further defined as having a first outer lateral side proximate said upper article support channel and located a first lateral distance from said handle, and a second, inner lateral side located laterally opposite said handle, and closer thereto, said upper article support member being rotatable about said handle from a first orientation in which said upper article support channel overlies and is vertically aligned with some lower article support channel, to a second orientation in which said second lateral edge of said member is located on the same lateral side of said handle as said lower article support channel but laterally inwardly thereof, thereby allowing clearance for an upper portion of an article within said lower article support channel.

4. The leveraging dolly of claim 3 further including an upper article fastening member attached to said handle for engaging an upper end of an article protruding above said upper article support member.

5. The leveraging dolly of claim 4 wherein said upper article fastening member is further defined as a hook having a downwardly depending opening.

6. The leveraging dolly of claim 3 wherein said means for resiliently urging said upper and lower article support channels longitudinally towards one another is further defined as an elongated tensioning member attached at a first, lower end thereof to said base, and at a second, upper end thereof to said upper article support member.

7. The leveraging dolly of claim 6 wherein said tensioning member is further defined as a longitudinally elongated helical tension spring.

8. The leveraging dolly of claim 6 wherein said tensioning member is further defined as being an elastic cord.

9. The leveraging dolly of claim 2 wherein said plane containing said longitudinal axis of said handle is perpendicular to said longitudinal axis of said lower support channel.

10. The leveraging dolly of claim 9 wherein said plane perpendicular to said longitudinal axis of said lower support channel is further defined as being located midway between opposite lateral sides of said first rolling means.

11. The leveraging dolly of claim 10 wherein said first rolling means is further defined as being a first wheel having a rotation axis lying in said perpendicular plane.

12. The leveraging dolly of claim 11 wherein said second rolling means is further defined as being a caster having a rotation axis lying in a horizontal plane parallel to said base and a swivel axis lying in said perpendicular plane.

13. A transport system for pivotably lifting an individual tabular article such as a sheet of construction material or a table having front and rear edges from a generally horizontal storage or use orientation to a generally vertical transport or storage orientation, respectively, transferring a plurality of said articles individually to a common conveyance means, and transporting on said conveyance means said plurality of articles between first and second locations, said transport system comprising;
  a. a leveraging dolly comprising;
    i. a base having a generally flat upper surface,
    ii. a first, lower article support channel protruding upwardly from said upper surface of said base, said lower article support channel having an upwardly facing opening adapted to receive a first, rear edge of a tabular article,
    iii. a first, fixed-axle wheel protruding downwardly from a lower surface of said base, said first wheel being located proximate a first lateral side of said base and having a roll direction parallel thereto,
    iv. a second, swivelable-axle wheel protruding downwardly from said lower surface of said base, said second wheel being located on a position at an opposite lateral side of said lower article support channel,
    v. an elongated handle protruding upwardly from said base on the same side of said lower article support channel as said first wheel, said handle having an upper, hand grip region,
    vi. a second, upper article support member longitudinally slidably attached to said handle, said upper article support member having a second, downwardly protruding, upper article support channel having a downwardly facing opening adapted to receive a second, front edge of a tabular article, and
    vii. means for resiliently urging said upper and lower article support channels longitudinally towards one another, thereby maintaining said edge walls of said article within said channels while said upper end of said handle is pivoted upwardly in a vertical plane to elevate said rear edge of said article in a vertical plane to a vertical position in which said dolly and said article may be rolled on said wheels between desired locations, and said handle pivoted downwardly in a vertical plane to pivot said dolly and said held article downwardly on said swivel wheel to a horizontal use or storage orientation;

b. a common conveyance means consisting of a racking cart comprising;

i. a base having a generally flat, fore and aft symmetric, polygonal plan view shape, modified by a pair of generally rectangularly-shaped front and rear openings which protrude perpendicularly inwardly from front and rear edge walls, respectively, of said base, ii. caster wheels for rollably supporting said base attached to an underside thereof, and iii. a central article support member which protrudes perpendicularly upwardly from an upper surface of said base, said central article support member being disposed laterally midway between laterally disposed front and rear inner edge walls of said front and rear openings of said cart base, whereby said leveraging dolly holding a first article may be wheeled into a first of said front and rear openings of said cart base, said first article removed from said dolly and rested on said upper surface of said cart base propped up against a first side of said central article support member, said leveraging dolly removed from said first opening to fetch and retrieve a second article, rolled into said second opening, and said second article, removed from said dolly and rested on said upper surface of said cart base propped up against a second side of said central article support member opposite said first side thereof, thereby allowing said cart to be located with said plurality of articles in a symmetrically fore-and-aft weighted fashion.

14. The transport system of claim 13 wherein said racking cart thereof is further defined as having protruding upwardly from said upper surface of said base thereof front and rear pairs of laterally opposed article stop members located on opposite lateral sides of said front and rear openings of said cart base, proximate said front and rear edge walls, respectively, thereof.

15. The transport system of claim 13 wherein said racking cart is further defined as including front and rear vertically disposed article retainer members removable attachable at locations proximate said front and rear edge walls, respectively, of said cart base.

16. The transport system of claim 15 wherein said racking cart is further defined as having protruding upwardly from said upper surface of said base thereof front and rear pairs of laterally opposed article stop members located on opposite lateral sides of said front and rear openings of said cart base proximate said front and rear edge walls, respectively, thereof, said stop members being adapted to abut a lower edge of an article to prevent longitudinal sliding thereof of said cart.

17. The transport system of claim 14 further including a ramp block having a base, a ramp surface which slopes upwardly from a laterally disposed front edge of said base to a flat, laterally disposed vortex section, said block having a width less than that of said front and rear openings of said racking cart base to allow block to be inserted longitudinally inwardly to either of said openings to position said vertex adjacent an upper surface of said cart base, said vertex being located at a height above said base sufficient to insure than an article on said dolly clears upper edges of said article stop members.

18. A racking cart for transporting a plurality of articles, such as sheets of construction material or tables each having front and rear edges, said racking cart comprising;

a base having a generally flat rectangular plan view shape, modified by a pair of generally rectangularly-shaped front and rear openings which protrude perpendicularly inwardly from front and rear edge walls, respectively, of said base, said openings having fore and aft spaced apart, laterally disposed inner edge walls which define therebetween a laterally disposed cross arm between a pair of fore and aft disposed, laterally opposed side arms of said base, said cross arm and said pair of fore and aft side arms forming a generally H-shaped structure, b. casters having wheels for rollably supporting said base attached to an underside thereof, and c. a central article support member which protrudes perpendicular upwardly from an upper surface of said base, said central article support member being disposed laterally midway between said front and rear laterally disposed edge walls of said cross arm of said base, whereby a dolly holding a first article may be wheeled into a first of said front and rear openings of said cart base, said first article removed from said dolly and rested on said upper surface of said cart base propped up against a first side of said central article support member, said dolly removed from said first opening to fetch and retrieve a second article, rolled into said second opening, and said second article, removed from said dolly and rested on said upper surface of said cart base propped up against a second side of said central article support bale member opposite said first side thereof, thereby allowing said cart to be located with said plurality of articles in a symmetrically fore-and-aft weighted fashion.

19. The racking of claim 18 wherein said casters are further defined as comprising at least a first caster attached to said base near the center of said cross arm, and four separate casters located near front and rear ends of said laterally opposed side arms of said base.

20. The racking cart of claim 19 wherein said cross arm of said base is further defined as being of a construction which causes laterally opposed portions of said cross arm to flex downwardly about a longitudinally disposed center line through said cross arm when articles are supported on an upper surface of said base.

21. The racking cart of claim 20 wherein said lower surfaces of said corner casters lie in a plane above the lower surface of said center casters when said cart is unloaded.

22. The racking cart of claim 21 wherein said first center caster is further defined as having a fore-and-aft disposed axle.

23. The racking cart of claim 22 further including a second center caster.

24. The racking cart of claim 23 wherein said second center caster is further defined as having a fore-and-aft disposed axle laterally displaced from that of said first center caster.

25. The racking cart of claim 24 wherein said corner casters comprise a first, left front caster spaced laterally inwards a first, front lateral distance from a first side of said base, a second, left rear caster spaced longitudinally apart from said first caster and spaced laterally inwards a second, rear lateral distance different from said first lateral distance from said first side of said base, a third, right front caster spaced laterally inwards from a second side of said base at a third, front lateral distance therefrom, and a fourth, right rear caster spaced longitudinally rearwards of said third caster and spaced laterally inwards of said second side of said base at fourth, rear lateral distance different from said third distance.

26. The racking cart of claim 25 wherein lateral spacing between laterally opposed pairs of said corner casters is further defined as being a non-integer multiple of a spacing between periodic discontinuities of a surface on which said racking cart is intended to be rolled.

* * * * *